(12) United States Patent
Akabane et al.

(10) Patent No.: US 9,784,932 B2
(45) Date of Patent: Oct. 10, 2017

(54) OPTICAL MEMBER AND OPTICAL MODULE

(71) Applicant: FUJITSU COMPONENT LIMITED, Tokyo (JP)

(72) Inventors: Ayumu Akabane, Tokyo (JP); Osamu Daikuhara, Tokyo (JP); Satoshi Moriyama, Tokyo (JP); Nobuyoshi Shimizu, Tokyo (JP); Toshihiro Kusagaya, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 353 days.

(21) Appl. No.: 14/249,521

(22) Filed: Apr. 10, 2014

(65) Prior Publication Data

US 2016/0170160 A1    Jun. 16, 2016

(30) Foreign Application Priority Data

Apr. 26, 2013 (JP) .................................. 2013-094707

(51) Int. Cl.
*G02B 6/12* (2006.01)
*G02B 6/42* (2006.01)

(52) U.S. Cl.
CPC .......... *G02B 6/4239* (2013.01); *G02B 6/4206* (2013.01)

(58) Field of Classification Search
None
See application file for complete search history.

(56) References Cited

U.S. PATENT DOCUMENTS

| | | | | |
|---|---|---|---|---|
| 7,306,689 | B2* | 12/2007 | Okubora | G02B 6/13 156/235 |
| 7,792,404 | B2* | 9/2010 | Streltsov | G02B 6/4219 385/52 |
| 8,063,975 | B2* | 11/2011 | Butterfield | H01L 27/14685 348/340 |
| 8,482,926 | B2 | 7/2013 | Yano et al. | |
| 2008/0136955 | A1* | 6/2008 | Kathman | G11B 7/123 348/340 |
| 2009/0284837 | A1* | 11/2009 | Lake | B29D 11/00365 359/619 |
| 2010/0166362 | A1 | 7/2010 | Fujii et al. | |

FOREIGN PATENT DOCUMENTS

| | | |
|---|---|---|
| JP | 2002-258008 | 9/2002 |
| JP | 2010-102313 | 5/2010 |
| JP | 2010-152111 | 7/2010 |

* cited by examiner

*Primary Examiner* — Sung Pak
(74) *Attorney, Agent, or Firm* — IPUSA, PLLC

(57) ABSTRACT

An optical member includes a base having a surface, and a plurality of protrusions formed on the surface of the base. The plurality of protrusions is arranged in a form to cause a space between the protrusions to be filled up with adhesive to adhere an adhesion target component above the base by a capillary phenomenon.

14 Claims, 17 Drawing Sheets

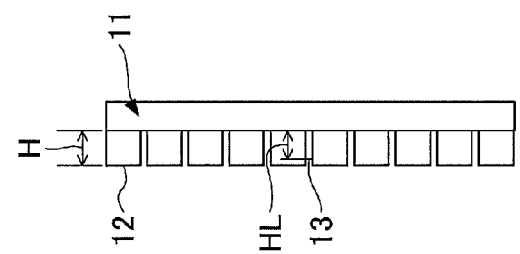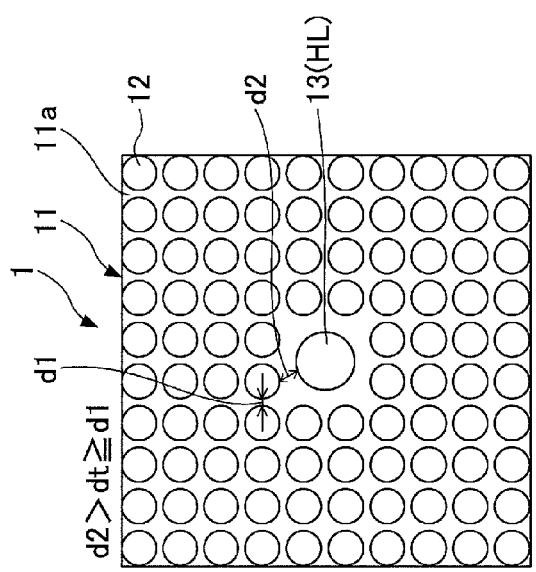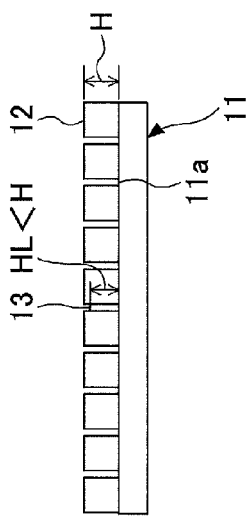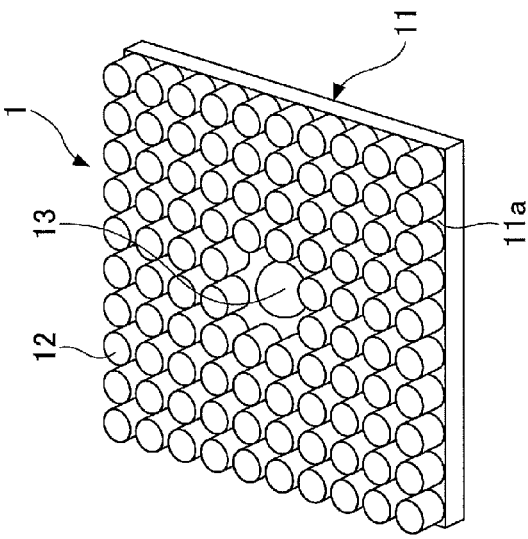

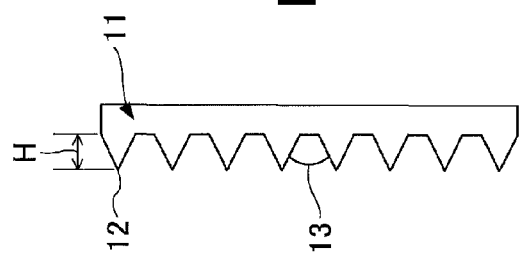
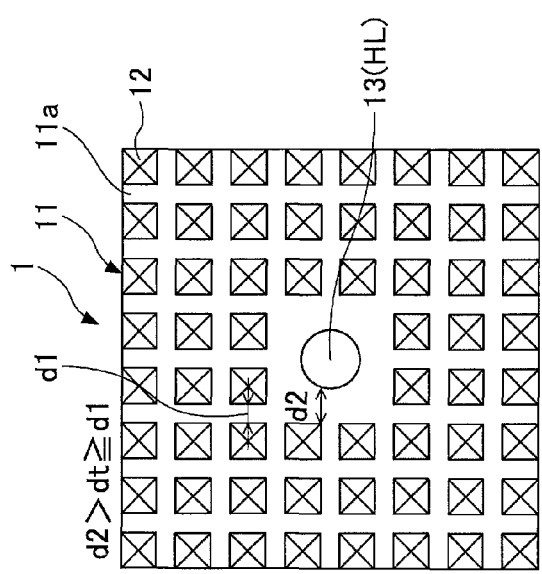
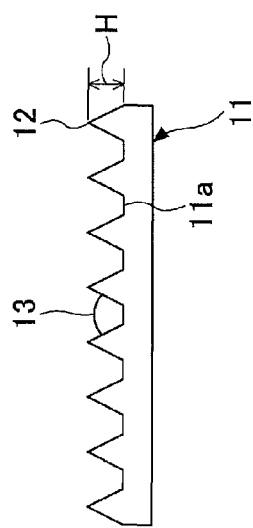
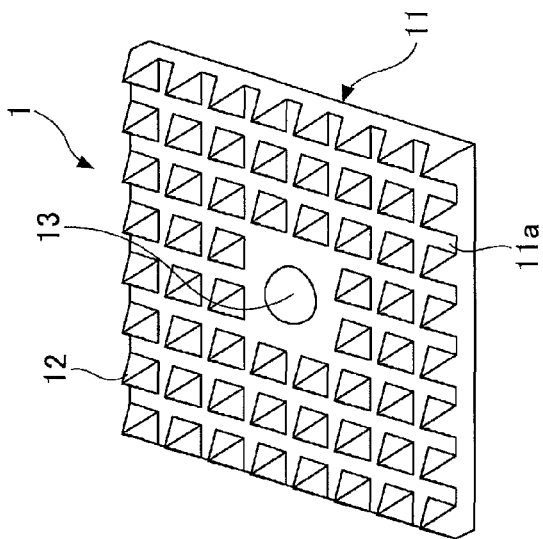

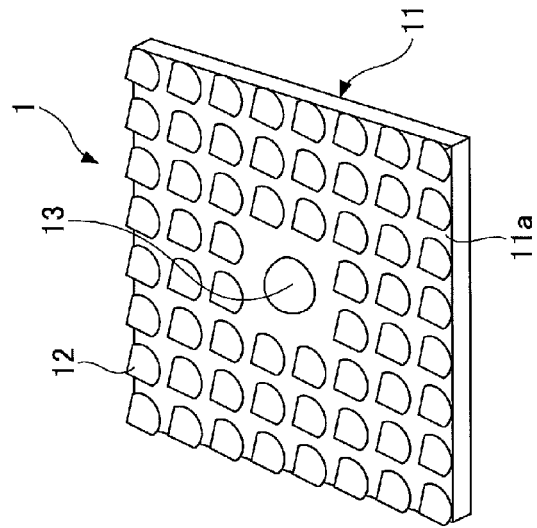
FIG.7D
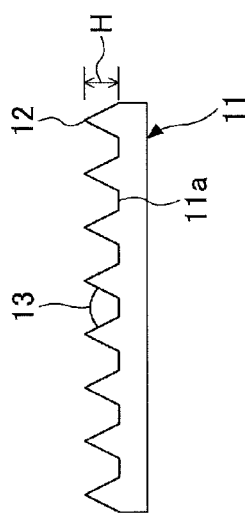
FIG.7C
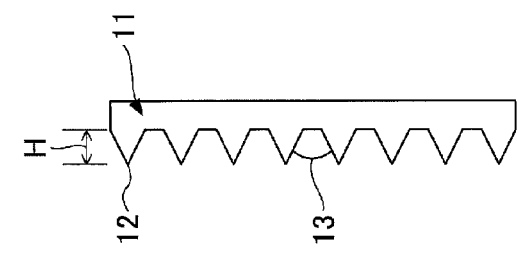
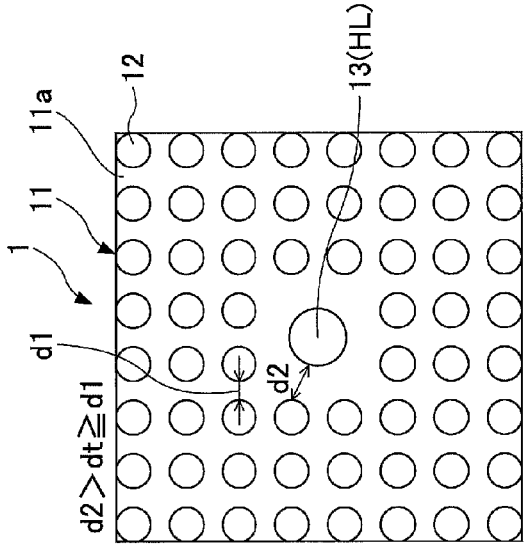
FIG.7A
FIG.7B

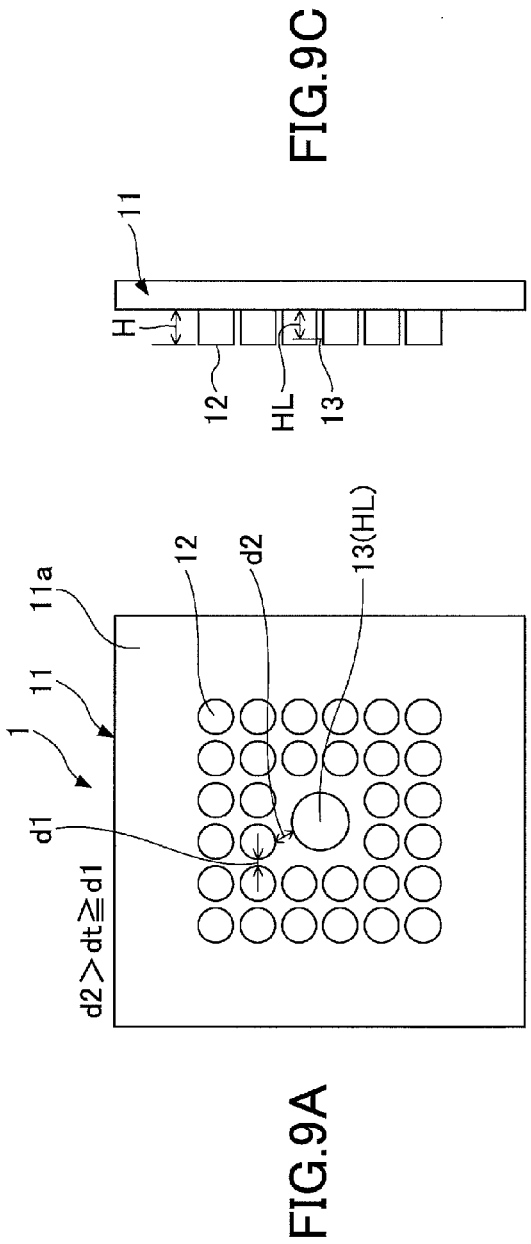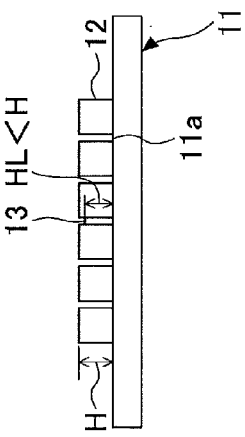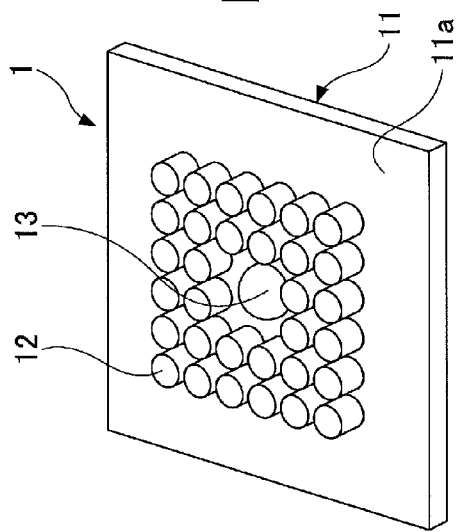

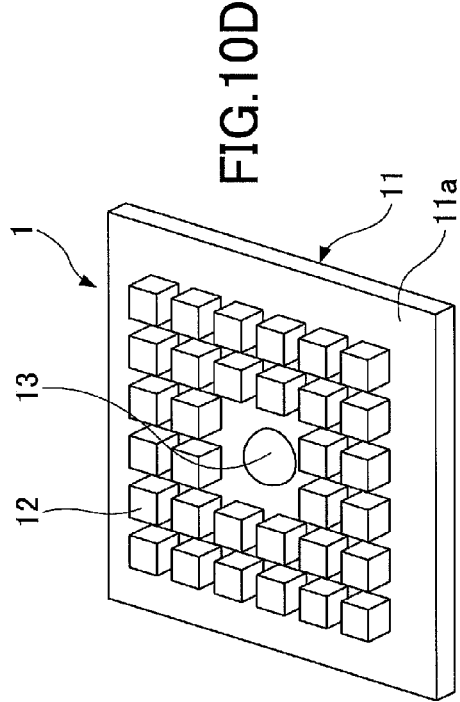
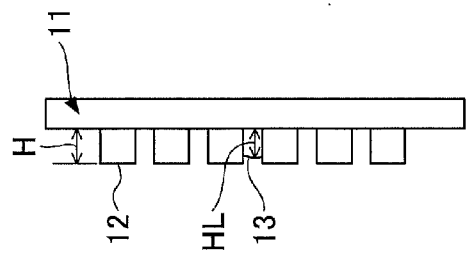
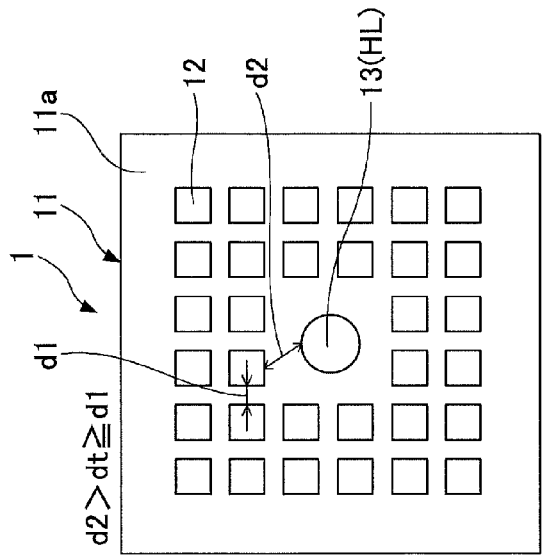
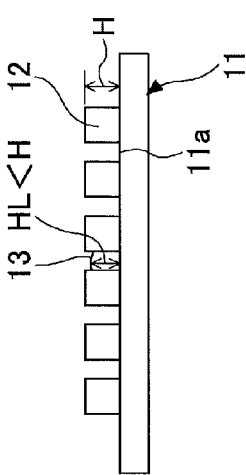

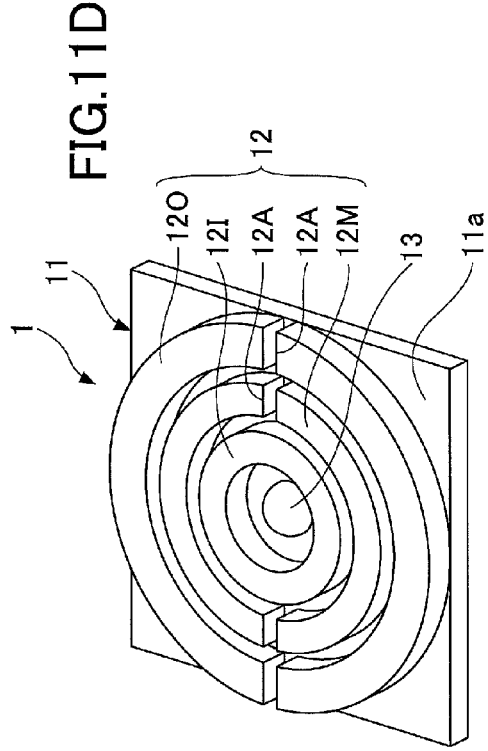
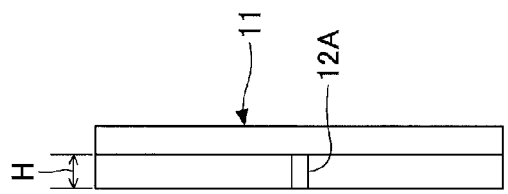
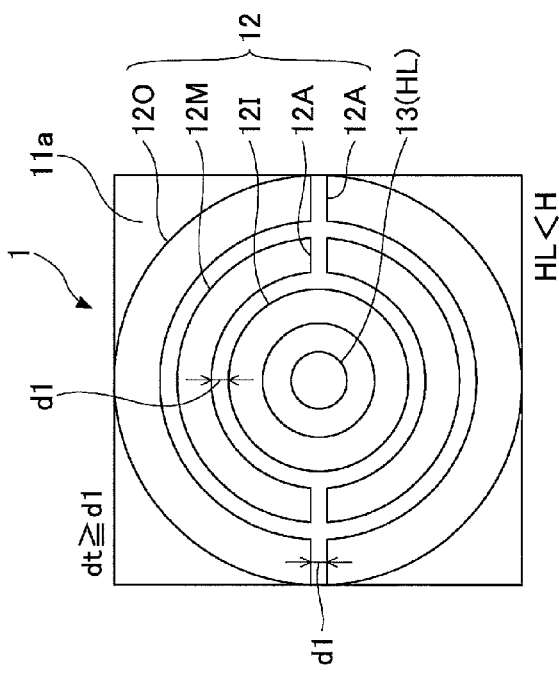
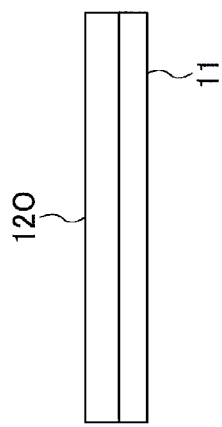

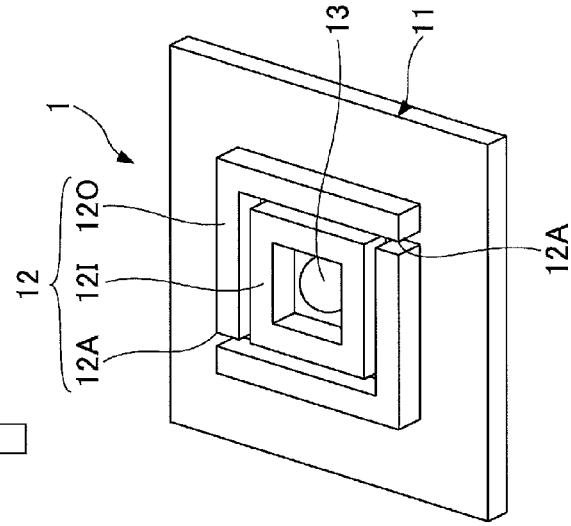
FIG.12C
FIG.12D
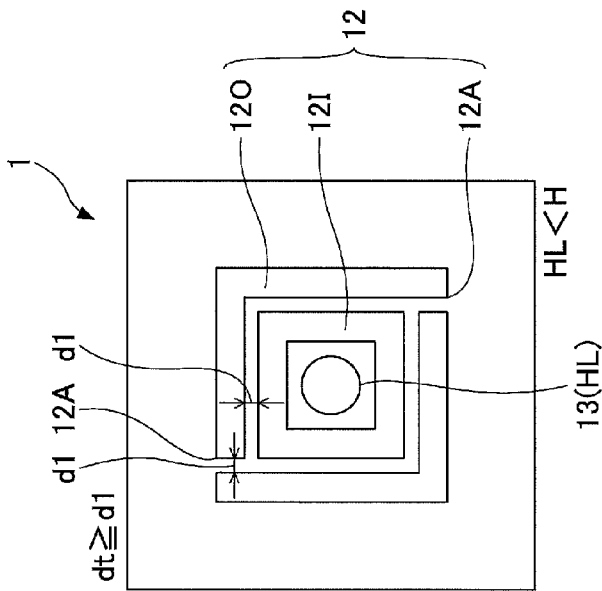
FIG.12A
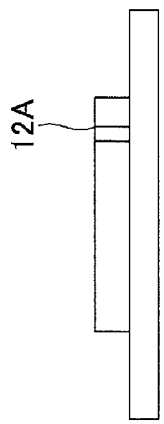
FIG.12B

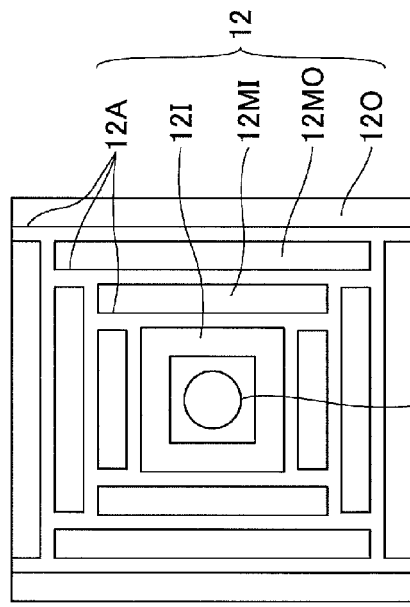
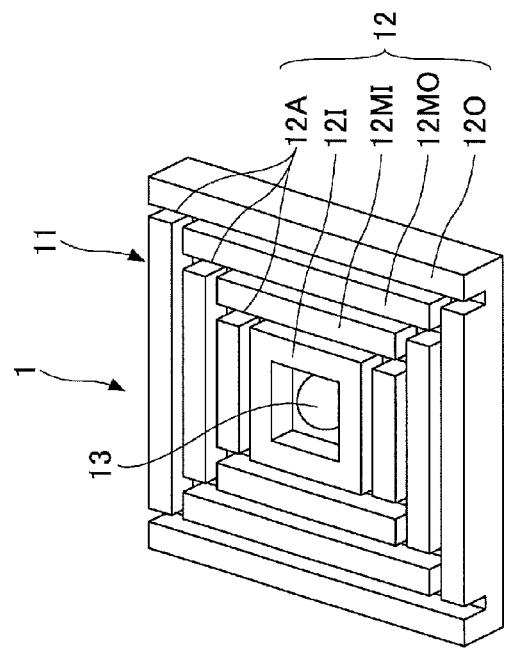
FIG.13A  FIG.13B  FIG.13C  FIG.13D

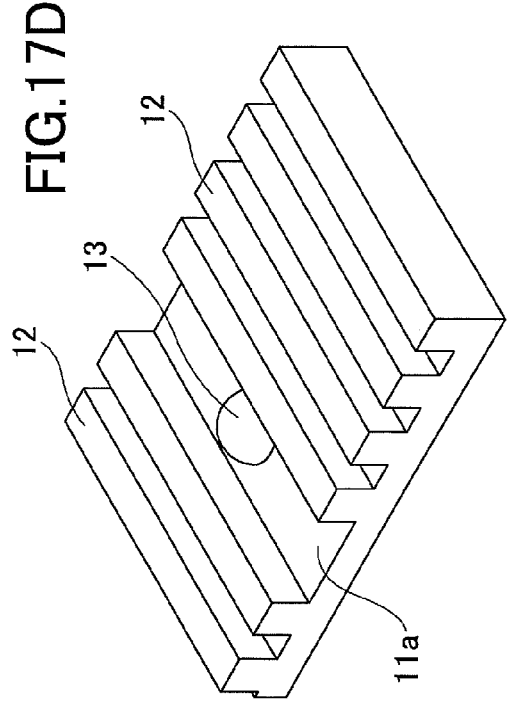
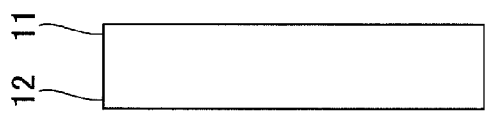
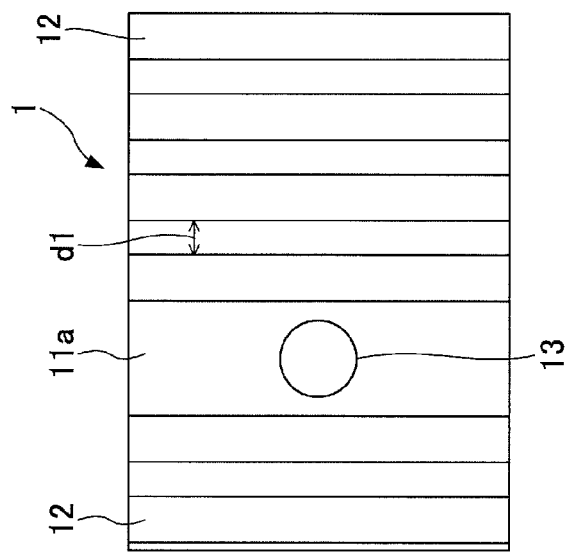
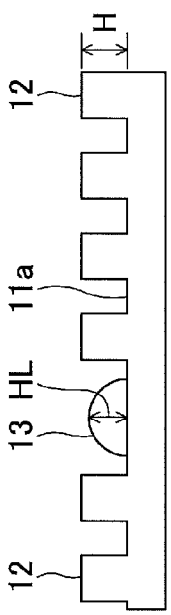

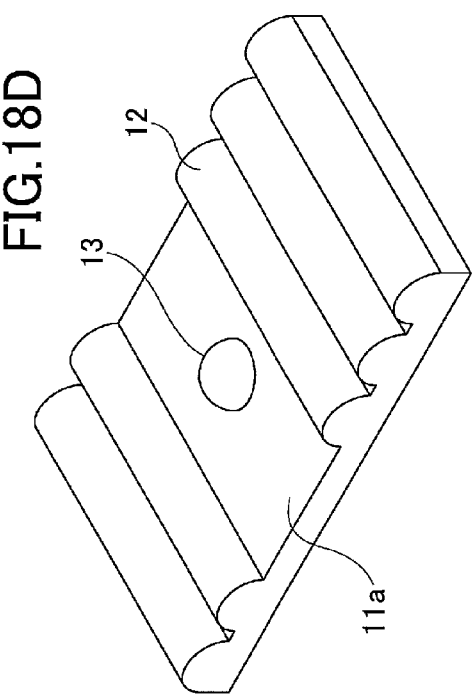
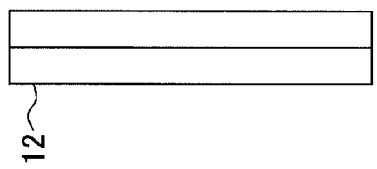
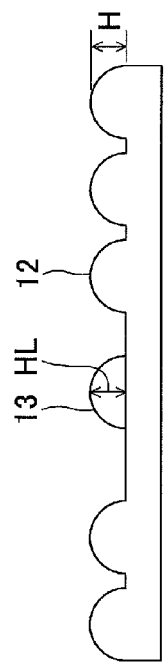
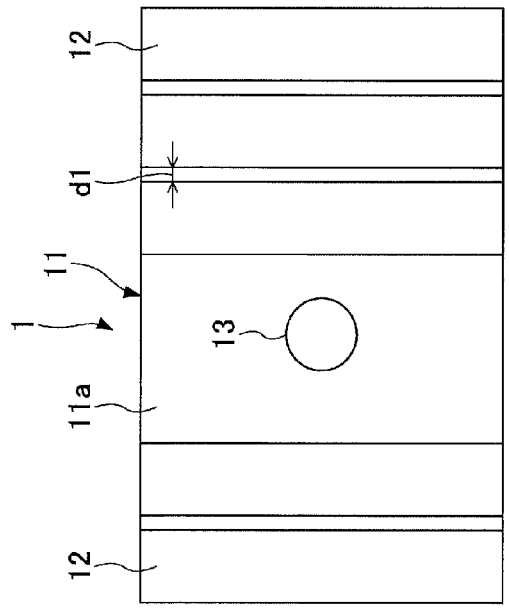
FIG.18A
FIG.18B
FIG.18C
FIG.18D

OPTICAL MEMBER AND OPTICAL MODULE

CROSS-REFERENCE TO RELATED APPLICATIONS

This patent application is based upon and claims the benefit of priority of Japanese Patent Application No. 2013-94707 filed on Apr. 26, 2013, the entire contents of which are incorporated herein by reference.

BACKGROUND OF THE INVENTION

1. Field of the Invention

The present invention relates to an optical member used for optical transmission and an optical module to which the optical member is applied.

2. Description of the Related Art

Although a copper cable is used for a high-speed interface of a supercomputer and a high-end server, transmission distance decreases along with growth of high-speed transmission of signals. For that reason, application of optical communication that can respond to the high-speed transmission of signals and can increase the transmission distance has been increasing.

In the optical transmission, connecting a photoelectric converter with an optical waveguide by a lens and a mirror is performed in general. For example, Japanese Laid-Open Patent Application Publication No. 2010-102313 discloses a technique of adhesion and an optical connection between a lens sheet including a lens and a substrate on which a photoelectric converter is mounted.

However, in the technique disclosed in Japanese Laid-Open Patent Application Publication No. 2010-102313, the lens sheet and the substrate have to be adhered after an adhesive used for adhesion is accurately set around the lens of the lens sheet. In other words, there is concern that this may cause an increase in manufacturing difficulty and costs.

SUMMARY OF THE INVENTION

According to an embodiment of the present invention, there is provided an optical member that includes a base having a surface, and protrusions formed on the surface of the base. The protrusions are arranged in a form to cause a space between the protrusions to be filled up with an adhesive to adhere an adhesion target component above the base by a capillary phenomenon.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIGS. 1A though 1D are schematic diagrams illustrating an optical member according to a first embodiment of the present invention;

FIGS. 6A through 6D are schematic diagrams illustrating another example of an optical member according to the first embodiment;

FIGS. 7A through 7D are schematic diagrams illustrating another example of an optical member according to the first embodiment;

FIGS. 9A through 9D are schematic diagrams illustrating another example of an optical member according to the first embodiment;

FIGS. 10A through 10D are schematic diagrams illustrating another example of an optical member according to the first embodiment;

FIGS. 11A through 11D are schematic diagrams illustrating an example of an optical member according to a second embodiment of the present invention;

FIGS. 12A through 12D are schematic diagrams illustrating another example of an optical member according to the second embodiment;

FIGS. 13A through 13D are schematic diagrams illustrating another example of an optical member according to the second embodiment;

FIGS. 17A through 17D are schematic diagrams illustrating another example of an optical member according to the third embodiment; and FIGS. 18A through 18D are schematic diagrams illustrating another example of an optical member according to the third embodiment.

DESCRIPTION OF EMBODIMENTS

Figure 2A:
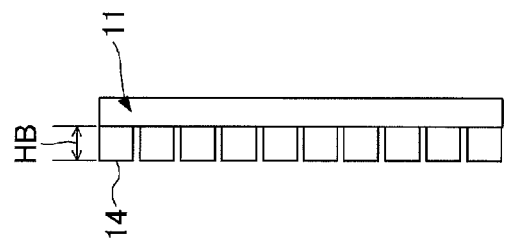
FIGS. 2A through 2D are schematic diagrams illustrating the optical member according to the first embodiment as seen from an opposite side of a lens sheet.

A description is given below, with reference to the accompanying drawings, of respective embodiments of the present invention. Here, a detailed description of well-known configuration and material is arbitrarily omitted, and a description is mainly given of a configuration according to embodiments of the present invention.

First Embodiment

FIG. 1A is a plan view of an optical member of a first embodiment, and FIG. 1B is a side view of the optical member. FIG. 1C is a front view of the optical member, and FIG. 1D is a perspective view of the optical member. A lens sheet (an example of an optical member) 1 of the first embodiment illustrated in FIG. 1 is made of transparent synthetic resin, and includes a base 11 including a surface 11a and protrusions 12 formed into a circular cylindrical shape on the surface 11a by an imprint technique. The imprint technique means a technique that transcribes a shape into the base of the transparent synthetic resin by a die and hardens the synthetic resin, by ultraviolet irradiation or other means. Moreover, the lens sheet may be formed of a member that has flexibility.

The protrusions 12 control a thickness of an adhesion layer that adheres an adhesion target and the base 11, in other words, a position of the adhesion target relative to the surface 11*a* of the base 11. The protrusions 12 have a height of H from the surface 11*a*. Furthermore, the protrusions 12 have an arrangement that causes a space between the protrusions 12 to be filled up with an adhesive that constitutes the adhesion layer by a capillary phenomenon.

In the first embodiment, a distance d1 between adjacent protrusions 12 is made equal to or shorter than a threshold dt determined based on properties of the adhesive, the base 11 and the protrusions 12 (particularly, wet-spreading properties of the adhesive when dropped and applied). The threshold dt is obtained from an experiment or a simulation, and is the value at which the space between the protrusions 12 can be filled up with the adhesive by the capillary phenomenon. In FIG. 1, a distance between the adjacent protrusions 12 that do not need to be filled up with the adhesive is made longer than the threshold dt.

In addition, the lens sheet 1 in the first embodiment includes a lens 13 formed on the surface 11*a* by the imprint technique, and the protrusions 12 are arranged in a matrix in an area on the surface 11*a* where the lens 13 is not formed. The height H of the protrusions 12 is determined by a focal length of the lens 13. In the first embodiment, the height H of the protrusions 12 is made higher than a lens height HL. Furthermore, a distance d2 between the lens 13 and the protrusions 12 adjacent to the lens 13 is made greater than the threshold dt so as not to fill up a space around the lens 13 with the adhesive.

Figure 2B:
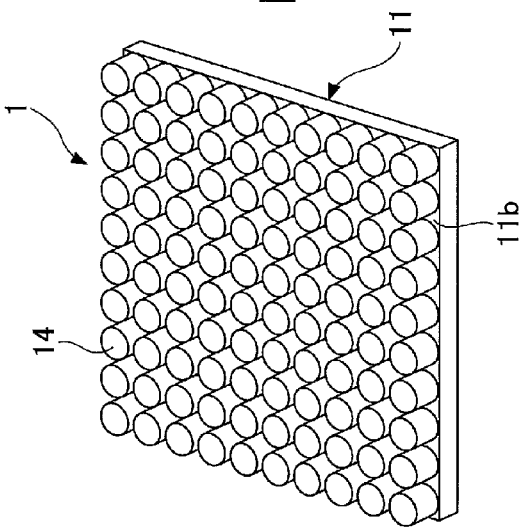
Figure 2C:
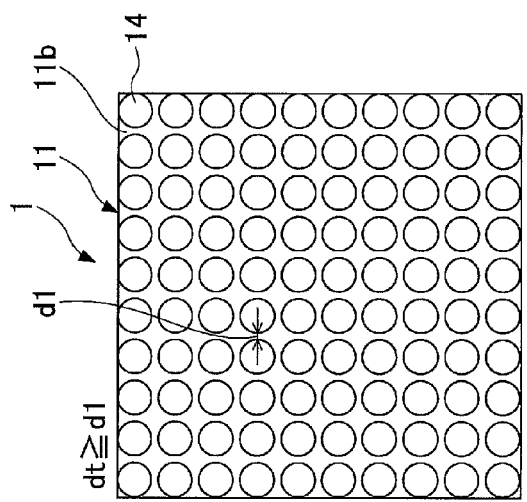
Figure 2D:
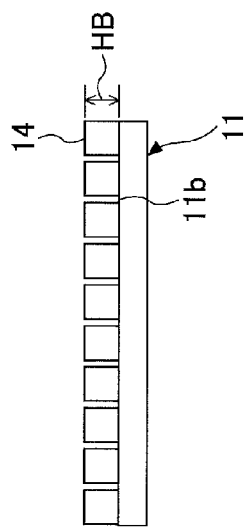

FIGS. 2A through 2D illustrate a surface 11*b* of the lens sheet 1 where the lens 13 is not formed. FIG. 2A is a plan view of the lens sheet 1, and FIG. 2B is a side view of the lens sheet. FIG. 2C is a front view of the lens sheet, and FIG. 2D is a perspective view of the lens sheet. Protrusions 14 having a height of HB arranged in a form of a matrix are formed on the whole area of the surface 11*a* by the imprint technique. Although not illustrated in FIGS. 1A through 1D and FIGS. 2A through 2D, the lens sheet according to the present embodiment includes protrusions on both sides thereon.

Figure 3:
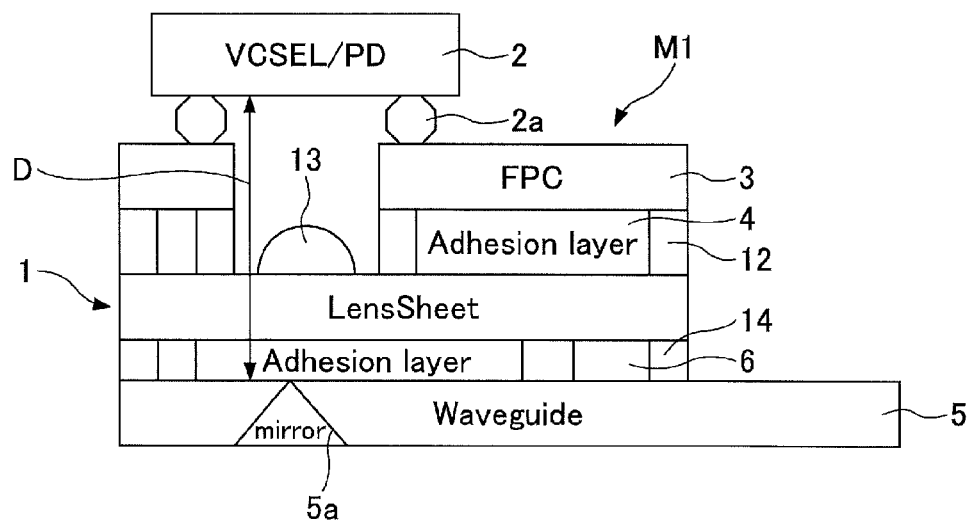
FIG. 3 is a schematic diagram illustrating an optical module according to the first embodiment.

Next, a description is given of an optical module M1 including the lens sheet 1 of the first embodiment with reference to FIG. 3. The optical module M1 includes a VCSEL/PD 2 (Photoelectric Converter: Vertical Cavity Surface Emitting Laser/Photo Diode), a flexible printed circuit (FPC) 3 (a substrate), an adhesion layer 4, an optical waveguide plate (waveguide) 5 and an adhesion layer 6.

The VCSEL/PD 2 is connected to leg portions 2*a* that are terminals for an electrical connection, which are connected and fixed to pads connected to an interconnection pattern of the FPC 3 (not shown in the drawing) by a connection method such as soldering. A position of the FPC 3 in a height direction on the side where the lens 13 is formed is controlled by the protrusions 12 having the height H, and the FPC 3 is adhered and fixed on the top of the protrusions 12 by the adhesion layer 4 while matching a distance between the lens 13 and the VCSEL/PD 2 to the focal length of the lens 13.

The waveguide 5 is made of a transparent member, and is adhered and fixed to the surface 11*b* in which the lens 13 is not formed by the adhesion layer 6 while the position relative to the lens sheet 11 is controlled by the protrusions 14 having the height HB. A mirror 5*a* is formed at a position of the waveguide 5 corresponding to the lens 13. A distance D between the VCSEL/PD 2 and the waveguide 5 is controlled by the heights of protrusions 12 and protrusions 14.

In the optical module M1 in the first embodiment, the VCSEL/PD 2 converts an electric signal input from the terminals not shown in the drawing to an optical signal, and the optical signal is transmitted to an optical fiber in an optical cable not shown in the drawing through the lens 13, the mirror 5*a* and the waveguide 5. On the contrary, an optical signal from the optical fiber in the optical cable is transmitted to the VCSEL/PD 2 through the waveguide 5, the mirror 5*a* and the lens 13. The VCSEL/PD 2 converts the optical signal to an electric signal, and the electric signal is output to the terminals of the FPC 3. The conversion by the VCSEL/PD 2 may be performed in one direction, and the optical fiber may be a single core fiber or a multicore fiber.

Figure 4:
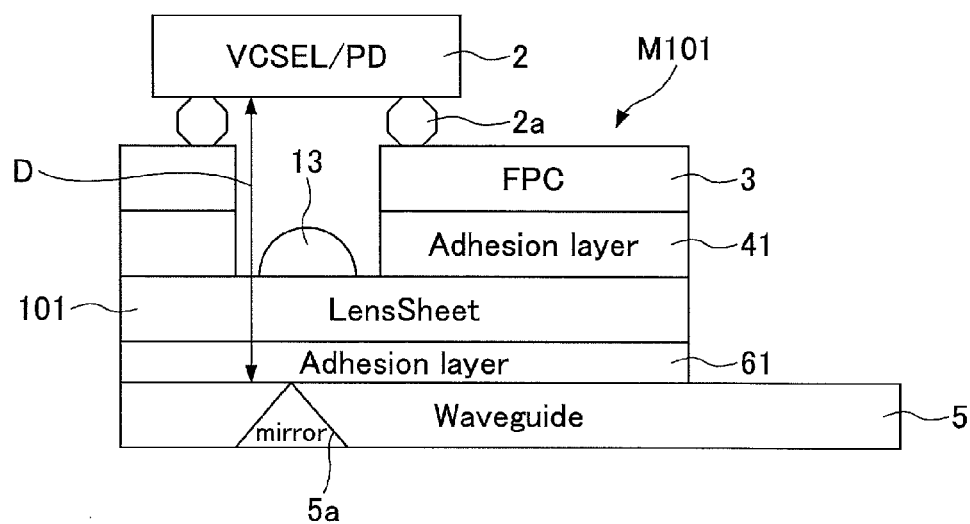
FIG. 4 is a schematic diagram illustrating an optical module according to a comparative example.
Figure 5C:
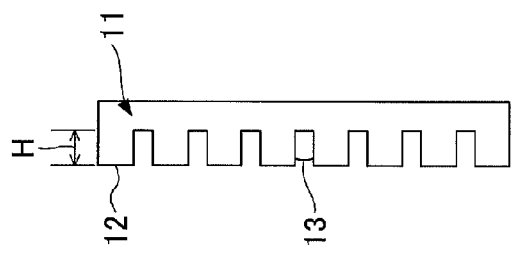
FIGS. 5A through 5D are schematic diagrams illustrating another example of an optical member according to the first embodiment.
Figure 5D:
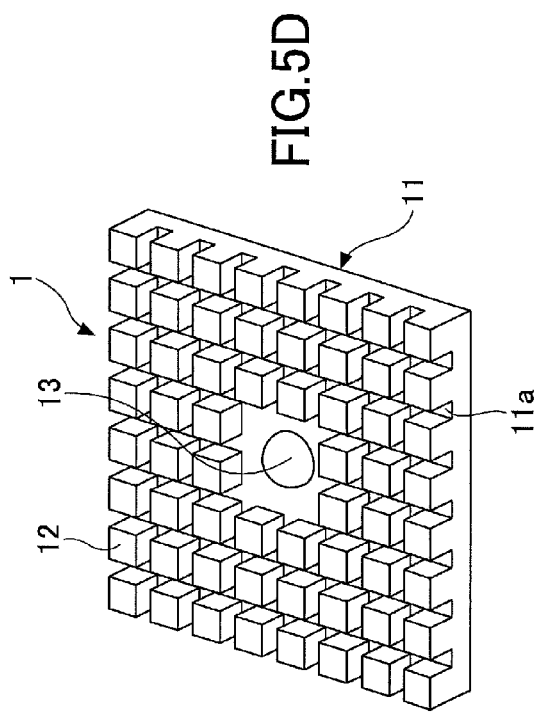
Figure 5A:
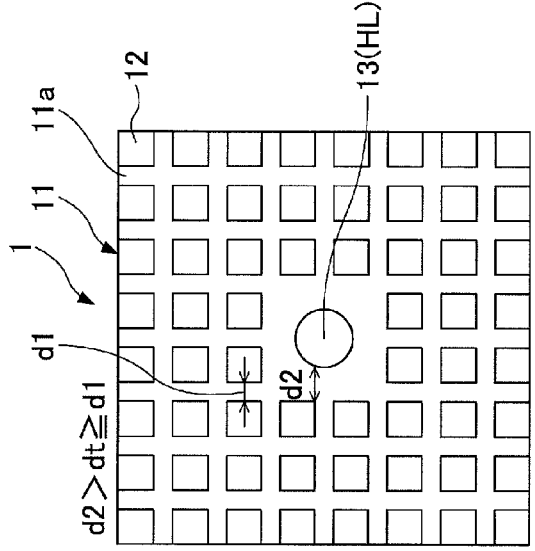
Figure 5B:
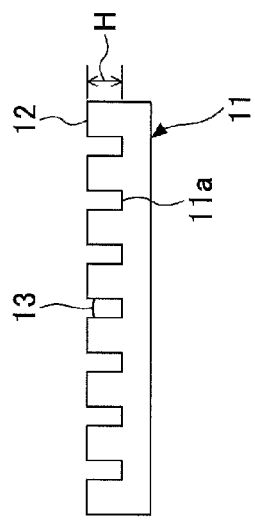
Figure 8D:
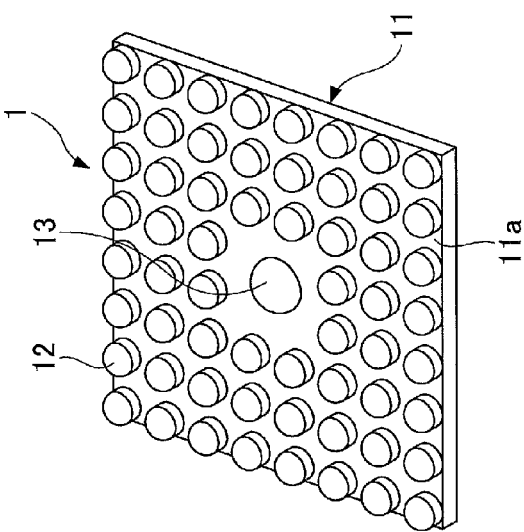
FIGS. 8A through 8D are schematic diagrams illustrating another example of an optical member according to the first embodiment.
Figure 8C:
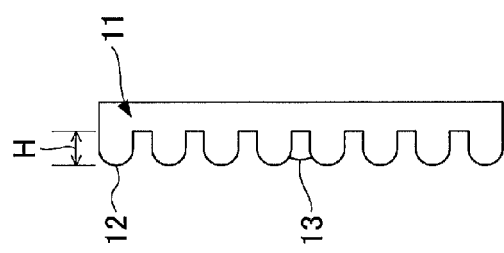
Figure 8A:
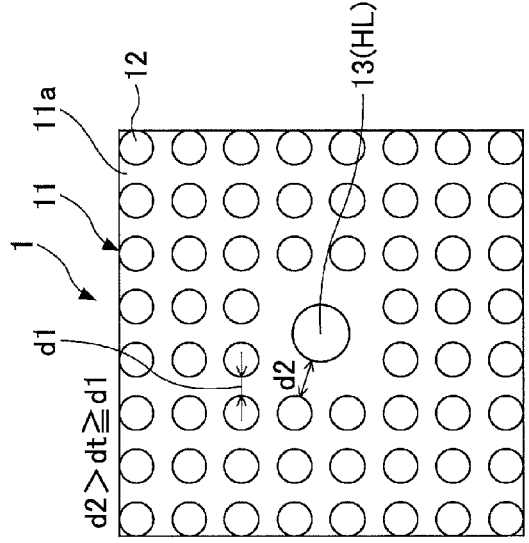
Figure 8B:
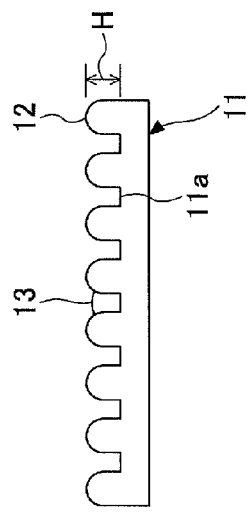

A description is given below of an optical module M101 of a comparative example with reference to FIG. 4. In FIG. 4, the same numerals are attached to the same components as the optical module M1 in the first embodiment. The optical module M101 includes a lens sheet 101, the VCSWL/PD 2, the FPC 3, an adhesion layer 41, the waveguide 5, and an adhesion layer 61. Here, the adhesion layer 41 and the adhesion layer 61 are, for example, an adhesive tape. In other words, in the optical module M101, a distance between the waveguide 5 and the VCSL/PD 2 is controlled by the thicknesses of the adhesion layer 41 and the adhesion layer 61.

In the first embodiment, in forming the adhesion layer 4 and the adhesion layer 6, the adhesion tape is not used, but an adhesive fluid is used. As discussed above, the distance d1 between the adjacent protrusions 12 each other formed in the first embodiment is set equal to or less than the threshold dt that is a required condition to cause the capillary phenomenon.

Accordingly, in forming the adhesion layer 4 and/or the adhesion layer 6 as illustrated in FIG. 3, the adhesive is applied or dropped to the protrusions 12 arranged in a matrix illustrated in FIG. 1 from an outer periphery of the base 11 by using, for example, a dispensing method. The application or the dropping of the adhesive may be performed at any timing when, before or after the FPC 3 is placed on the lens sheet 1, or when, before or after the lens sheet 1 is placed on the waveguide 5.

In other words, in the first embodiment, by setting a position for applying or dropping the adhesive at an outer periphery, the adhesion layer 4 and the adhesion layer 6 can be formed while filling up the whole area including the protrusions 12 and 14 arranged therein in the matrix with the adhesive by the capillary phenomenon. The optical module M1 according to the first embodiment can eliminate the need to accurately set the adhesive on the intended area.

In addition, in the first embodiment, because the distance d2 between the lens 13 and the adjacent protrusions 12 is set to be greater than the threshold dt, an area surrounding the lens 13 is not filled up with the adhesive introduced from the outer periphery. More specifically, the optical module M1 according to the first embodiment can improve the adhesive properties by forming the adhesion layer 4 and the adhesion layer 6 by introducing the adhesive from the outer periphery, and can implement to improve the optical performance more readily by preventing the area surrounding the lens 13 from being filled up with the adhesive without causing the increase in costs.

Furthermore, in the first embodiment, because the distance D illustrated in FIG. 3 is not controlled by the thickness of the adhesion layer but by the height H of the protrusions 12 and the height HB of the protrusions 14 formed on the lens sheet 1, the distance D can be controlled more accurately. Moreover, the optical module M1 according to the first embodiment can also control the distance between the lens sheet 1 and the VCSEL/PD 2 and the distance between the lens sheet 1 and the mirror 5a accurately.

The protrusions 12 and 14 shown in the first embodiment is illustratively shaped into a circular cylinder, but the shape of the protrusions may be replaced by a shape such as a prism illustrated in FIGS. 5A through 5D, a pyramid illustrated in FIGS. 6A through 6D, a cone illustrated in FIGS. 7A through 7D, a circular cylinder having a hemisphere (partial sphere) at the top illustrated in FIGS. 8A through 8D. With respect to the protrusions 12 of the prism illustrated in FIGS. 5A through 5D, the distance d1 between the protrusions 12 can be managed more precisely compared to the circular cylinder illustrated in FIGS. 1A through 1D.

The shapes of the protrusions can be arbitrarily selected depending on, for example, ease of molding by the imprint technology, adjustment of an amount of the adhesive, ease of control of filling by the capillary phenomenon and the like. When configurations illustrated in FIGS. 6A through 8D are adopted, the distance between the protrusions on the side contacting the FPC 3 becomes broad. Therefore, it is preferable to apply or drop the adhesive by the dispensing method at the space between FPC 3 and the protrusions 12 by utilizing the capillary phenomenon after the lens sheet 1 is placed on the waveguide 5 and the FPC 3 is placed on the lens sheet 1.

In addition, the embodiments illustrated in FIGS. 6A through 8D can improve release of the die after the molding, in forming the lens sheet 1 by the imprint technique by transcribing a shape to a transparent synthetic resin by a die having the shape matching the protrusions 12.

In addition, the protrusions 12 of the circular cylinder form illustrated in FIGS. 1A through 1D can be arranged in two lines in a frame shape around the lens 13 as illustrated in FIG. 9A through 9D other than being arranged in the matrix on the whole surface 11a. Similarly, the protrusions 12 in the prism illustrated in FIGS. 5A through 5D can be arranged in two lines in the frame shape around the lens 13 as illustrated in FIGS. 10A through 10D. The configurations illustrated in FIGS. 9A through 10D are effective when an area in which the adhesive is distributed is made only in the vicinity of the lens 13.

Second Embodiment

Other than the forms illustrated in the first embodiment, the protrusions 12 can be arranged in an annular shape relative to the lens 13. A description is given below of a second embodiment regarding the above embodiment with reference to FIGS. 11A through 13D. In FIGS. 11A through 13D, FIGS. 11A, 12A and 13A are planar perspective views of optical members, and FIGS. 11B, 12B and 13B are side views of FIGS. 11A, 12A and 13A. FIGS. 11C, 12C and 13C are front views of FIGS. 11A, 12A and 13A, and FIGS. 11D, 12D and 13D are perspective views of FIGS. 11A, 12A and 13A.

As illustrated in FIGS. 11A through 11D, a lens sheet 1 of the second embodiment includes a lens 13 formed on a surface 11a by the imprint technique, and protrusions 12 formed on the surface 11a are arranged triply in a concentric fashion (one form of the annular shape) with respect to the center of the lens 13.

The protrusions 12 includes a protrusion 120 located at the outermost circumference, a protrusion 121 located on the innermost circumference, and a protrusion 12M located between the protrusions 120 and 121. The protrusion 120 and the protrusion 12M other than the innermost protrusion 121 include a pair of cutouts 12A in a transverse direction. A distance d1 between the adjacent protrusions 12 from each other and a distance d1 of the cutout 12A are set equal to or less than the threshold dt that causes the capillary phenomenon. A height H of the protrusions 120, 12M and 121 is determined by the focal length of the lens 13 similar to the first embodiment. The cutout 12A has a function of introducing the adhesive from the outer circumference of the protrusion 120 and the protrusion 12M to the inner circumference.

A shape of the protrusions 12 formed on the surface 11a is a circular ring. As illustrated in FIGS. 12A through 12D, the shape of protrusions 12 may be a polyangular ring (rectangular frame shape), and may be made a double ring. Moreover, as illustrated in FIGS. 13A through 13D, protrusions 12 are shaped into a quadruple polyangular ring, and two pairs of cutouts may be provided in the quadruple polyangular ring in a longitudinal direction and a transverse direction. The shape of protrusions 14 on a surface 11b (not shown in FIGS. 13A through 13D, see FIGS. 2A through 3) where the lens 13 is not formed may be in a beam-like shape having the height HB arranged in a radial direction (in a radial fashion), or any other form.

More specifically, in the second embodiment, the adhesion layer 4 and the adhesion layer 6 can be formed by applying or dropping the adhesive at a cutout 12A located on the outermost circumference illustrated in FIGS. 11A, 12A and 13A, and filling up the area in which the protrusions 12 are arranged in a radial direction of the lens 13 with the adhesive by the capillary phenomenon.

In addition, in the second embodiment, because the innermost protrusion 121 adjacent to the lens 13 is a ring shape without the cutout, the area surrounding the lens 13 is not filled up with the adhesive introduced from the cutout 12A. In other words, the optical module according to the second embodiment can enhance the adhesive properties by forming the adhesion layer 4 and the adhesion layer 6 by introducing the adhesive from the outer periphery, and implements to improve the optical performance more readily by preventing the area surrounding the lens 13 from being filled up with the adhesive without casing the increase in costs.

Moreover, in the second embodiment, similarly to the first embodiment, because the distance D between VCSEL/PD 2 and waveguide 5 is not controlled by the thickness of the adhesion layer but by the height H of the protrusions 12 and the height HB of the protrusions 14, the distance D can be controlled more accurately.

In the second embodiment, the shape of the protrusions 12 illustrated in FIGS. 11A through 13D can be arbitrarily selected based on, for example, the ease of molding by the imprint technique, the adjustment of the amount of the adhesive, the ease of control of filling by the capillary phenomenon and the like.

Third Embodiment

Figure 14C:
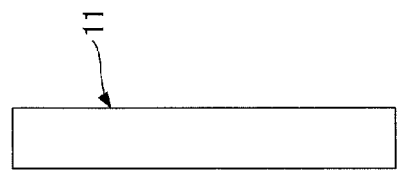
FIGS. 14A through 14D are schematic diagrams illustrating an example of an optical member according to a third embodiment of the present invention.
Figure 14D:
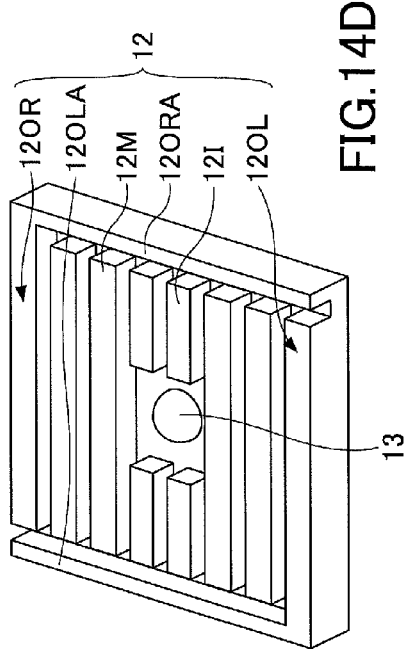
Figure 14A:
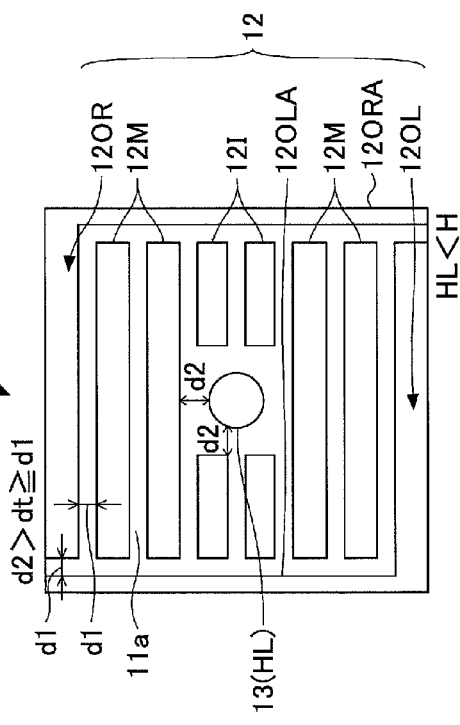
Figure 14B:
Figure 15C:
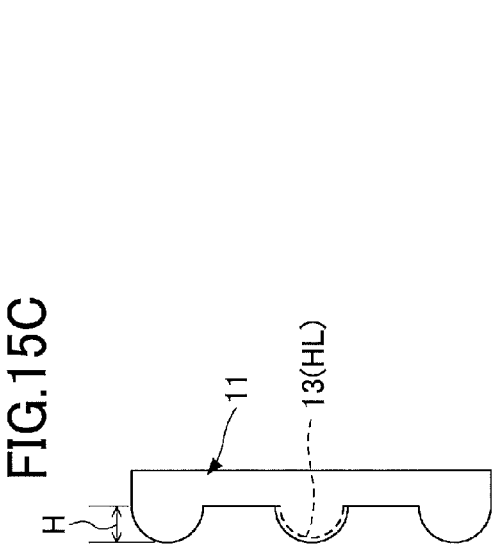
FIGS. 15A through 15D are schematic diagrams illustrating another example of an optical member according to the third embodiment.
Figure 15D:
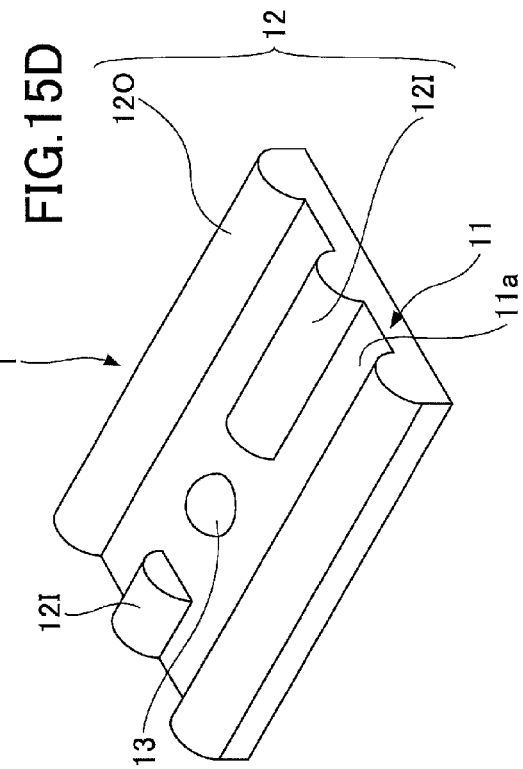
Figure 15A:
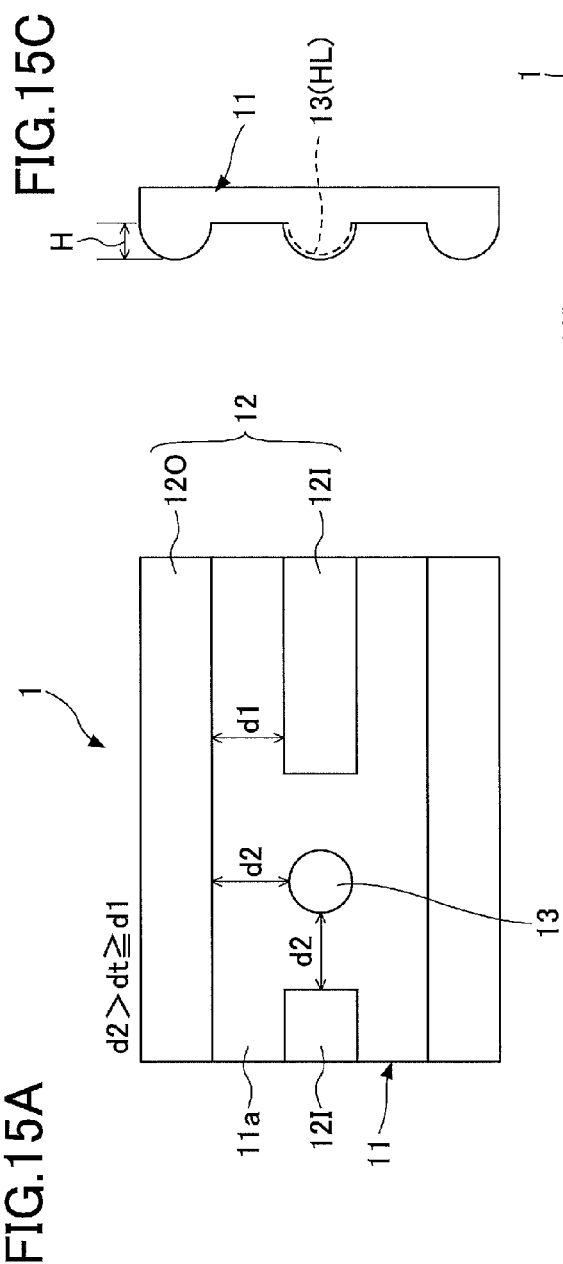
Figure 15B:
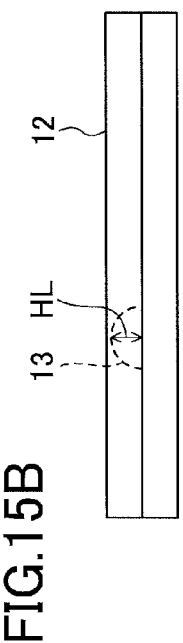
Figure 16C:
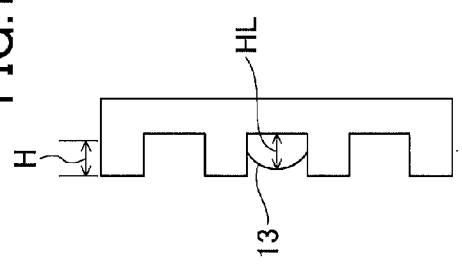
FIGS. 16A through 16D are schematic diagrams illustrating another example of an optical member according to the third embodiment.
Figure 16D:
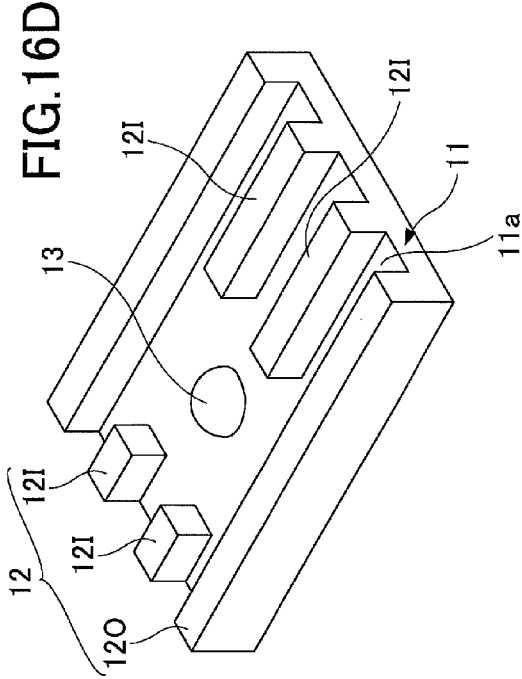
Figure 16A:
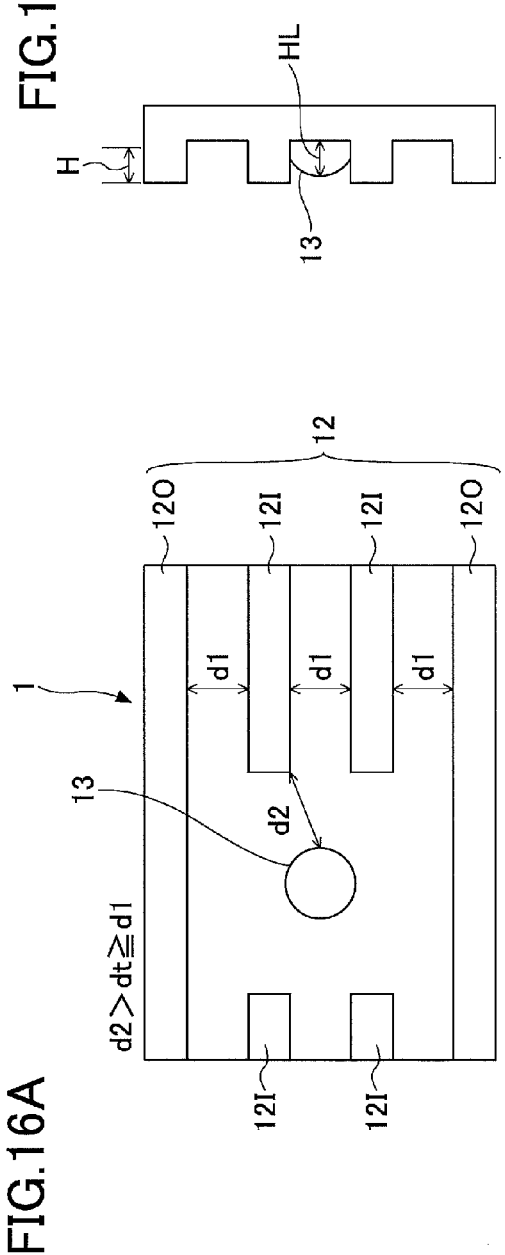
Figure 16B:

Although the first embodiment has illustrated the protrusions arranged in the matrix, it is possible to form protrusions in a beam-like shape extending along a planar direction of the lens sheet and arranged in multiple rows. A description is given below of a third embodiment relating to the above configuration with reference to FIGS. 14A through 14D. Similarly to FIGS. 1A through 1D, FIG. 14A is a plane view of the third embodiment, and FIG. 14B is a side view of FIG. 14A. FIG. 14C is a front view of FIG. 14A, and FIG. 14D is a perspective view of FIG. 14A.

In the third embodiment, protrusions 12 are shaped into eight rows made of beams that extend along a planar direction of the surface 11*a*, that is to say, in a transverse direction of FIG. 14A, and a cross-sectional shape of the protrusions 12 is made a quadrangle. Furthermore, in the third embodiment, pairs of central protrusions 121 are arranged so as to stride over the lens 13 by being divided by the lens 13; protrusions 12M located outside the protrusions 121 are formed in four rows of the beams that are not divided by the lens; and protrusions 12OR and 12OL are arranged further outside the protrusions 12M. Distances d2 between the lens 13 and the adjacent protrusions 121 and the protrusions 12M are made longer than the threshold dt.

Among protrusions 12 parallel to each other, protrusions 12OR and 12OL located on the outermost are formed into an L-shape respectively including facing parts 12ORA and 12OLA that face ends of the protrusions 121 and 12M in a lengthwise direction thereof. Distances d1 between the facing part 12ORA and the protrusions 121 and the protrusions 12M are also set at the threshold dt or less.

In other words, the distances between all the adjacent protrusions 12 in a longitudinal direction are set at the threshold dt or less. The protrusions 14 on the surface 11*b* where the lens 13 is not formed can be shaped into a beam-like shape having a height HB arranged in parallel in a longitudinal direction.

More specifically, in the third embodiment, the adhesion layer 4 and the adhesion layer 6 can be formed by introducing the adhesive from the outer periphery of the left end portion and the right end portion of the lens sheet, and filling up the whole areas where the protrusions formed into the beams are arranged in parallel with the adhesive by the capillary phenomenon.

In addition, because the distances d2 between the lens 13 and the protrusions 121 or the protrusions 12M are set greater than the threshold dt, the area around the lens 13 is not filled up with the adhesive introduced from the outer periphery. More specifically, in the third embodiment, the adhesive properties can be improved by forming the adhesion layer 4 and the adhesion layer 6 by introducing the adhesive from the outer periphery, and the optical performance can be improved by not filling up the area around the lens 13 with the adhesive, without causing the increase in costs.

Furthermore, in the third embodiment, because the distance D between VCSEL/PD and waveguide is controlled by the height H of the protrusions 12 and the height HB of the protrusions 14, but not by the thickness of the adhesive, the distance D can be controlled accurately similar to the first embodiment. Moreover, a distance between the lens sheet 1 and the VCSEL/PD 2, and a distance between the lens sheet 1 and the mirror 5*a*, can be also controlled accurately in the third embodiment.

Here, although the protrusions 12OR and 12OL on the outermost peripheral including the facing parts 12ORA and 12OLA have been illustrated as an arrangement of the protrusions 12 in the third embodiment, a simplified configuration can be adopted as illustrated in FIGS. 15A through 15D by arbitrarily omitting the facing parts and by reducing the number of the protrusion to three rows. Moreover, considering the ease of releasing the die in the imprint technique, the shape of the protrusions 12 can be arbitrarily made a semicircular circular cylinder.

Furthermore, as illustrated in FIGS. 16A through 16D, the protrusions 12 can be shaped into a quadrangular prism, and the number of the protrusion rows can be made four. Also, as illustrated in FIGS. 17A through 17D, it is possible to have a configuration in which the protrusions 12 extend in the longitudinal direction, and the adhesive is not applied to the area around the lens 13. In the configuration illustrated in FIGS. 17A through 17D, the cross-sectional view of the protrusions 12 can be replaced by a semicircular column as illustrated in FIGS. 18A through 18D.

In the configurations illustrated in FIGS. 15A through 18D, the locations to introduce the adhesive are made at the outer periphery located at the both ends of the protrusions in lengthwise directions thereof. In these configurations, the adhesive is not introduced to both ends in the longitudinal direction of the area in which the lens 13 is located.

In the configurations illustrated in FIGS. 17A through 18D, a distance between the lens 13 and the adjacent protrusions 12 is not subject to limitations by the threshold dt. In the third embodiment, the protrusions 14 on the surface 11*b* where the lens 13 is not formed may be made the configuration in the first embodiment.

Thus, according to the embodiments of the present invention, there is provided an optical member and an optical module that can facilitate setting an adhesive used for adhesion during the manufacture and can enhance adhesive properties without causing an increase in costs.

Although the embodiments of the present invention have been described in detail, it should be understood that the various changes, substitutions, and alterations could be made hereto without departing from the spirit and scope of the invention. For example, although the configurations of the protrusions 12 on the surface 11*a* in which lens 13 is formed and on the surface 11*b* in which the lens 13 is not formed are made the same as each other, the protrusions 12 on both sides may differ from each other.

The embodiments of the present invention relate to an optical member and an optical module, which can ensure reliability of adhesion without causing an increase in costs. Accordingly, the embodiments of the present invention is beneficial when being applied to electronic devices for family use, office use and industrial use that particularly require high-speed operation.

What is claimed is:

1. An optical member, comprising:
    a base;
    a lens formed on a surface of the base; and
    protrusions formed on the surface of the base,
    wherein a distance between two adjacent protrusions is set equal to or smaller than a threshold in which a space between the adjacent protrusions is filled up with an adhesive by capillary action, and
    a distance between the lens and any of the protrusions adjacent to the lens is set greater than the threshold.

2. The optical member of claim 1, wherein the threshold is determined based on properties of the adhesive, the base and the protrusions.

3. The optical member of claim 1, wherein a height of the protrusions is determined by a focal length of the lens.

4. The optical member of claim 2,
    wherein the protrusions formed on the surface in which the lens is formed thereon is arranged annularly with respect to a center of the lens, and the protrusions other than an innermost protrusion have cutouts.

5. The optical member of claim 1, wherein each of the protrusions has a beam-like shape extending along a planar direction of the surface of the base, and
the protrusions are arranged in parallel to each other.

6. The optical member of claim 5,
wherein the protrusions include a protrusion arranged so as to stride out the lens by being divided by the lens, and
a distance between the lens and the divided protrusion is greater than the threshold determined based on properties of the adhesive, the base and the protrusions.

7. The optical member of claim 5,
wherein the protrusions include an outermost protrusion, and
wherein the outermost protrusion includes a facing part facing an end of the other protrusions in a lengthwise direction of the other protrusions, and
a distance between the facing part and the end is equal to or smaller than the threshold distance.

8. An optical module, comprising:
a base;
a lens formed on a surface of the base;
protrusions formed on the surface of the base;
a photoelectric converter;
a substrate on which the photoelectric converter is mounted, and is adhered onto the first protrusions; and
an optical waveguide adhered onto the protrusions,
wherein distance between two adjacent protrusions is set equal to or smaller than a threshold in which a space between the adjacent protrusions is filled up with an adhesive by capillary action, and
a distance between the lens and any of the protrusions adjacent to the lens is set greater than the threshold.

9. An optical member, comprising:
a base having a surface;
an optical element provided on a first area of the surface of the base; and
protrusions provided on a second area of the surface of the base,
wherein a first distance between the protrusions adjacent to each other to be filled up with an adhesive is shorter than or equal to a threshold distance, and a second distance between the protrusions adjacent to each other not to be filled up with the adhesive and a third distance between the optical element and the protrusions not to be filled up with the adhesive are longer than the threshold distance, the threshold distance being an upper limit to be filled up with the adhesive by capillary action.

10. The optical member of claim 1, wherein the protrusions surround the lens and are arranged in a matrix.

11. The optical member of claim 1, wherein the protrusions surround the lens in a frame-like form, and at least an outermost protrusion has a cutout formed in a circumferential direction of the outermost protrusion, a distance of the cutout being equal to or smaller than the threshold.

12. The optical member of claim 1, wherein the protrusions are provided extending in the same direction and are arranged parallel with each other.

13. The optical member of claim 1, wherein each of the protrusions has a solid cylindrical shape and the protrusions are arranged in a matrix.

14. The optical member of claim 1, wherein the protrusions form a plurality of frames that are concentrically arranged so as to surround the lens.

* * * * *